(12) United States Patent
Ito

(10) Patent No.: US 11,619,999 B2
(45) Date of Patent: Apr. 4, 2023

(54) PROXIMITY DETECTION DEVICE AND INFORMATION PROCESSING SYSTEM

(71) Applicant: ALPINE ELECTRONICS, INC., Tokyo (JP)

(72) Inventor: Masato Ito, Iwaki (JP)

(73) Assignee: ALPINE ELECTRONICS, INC., Tokyo (JP)

(*) Notice: Subject to any disclaimer, the term of this patent is extended or adjusted under 35 U.S.C. 154(b) by 0 days.

(21) Appl. No.: 17/167,239

(22) Filed: Feb. 4, 2021

(65) Prior Publication Data
US 2021/0278907 A1 Sep. 9, 2021

(30) Foreign Application Priority Data
Mar. 3, 2020 (JP) .............................. JP2020-035466

(51) Int. Cl.
G06F 3/01 (2006.01)
G06F 3/04815 (2022.01)
(Continued)

(52) U.S. Cl.
CPC .............. *G06F 3/017* (2013.01); *B60K 35/00* (2013.01); *G06F 3/042* (2013.01); *G06F 3/0421* (2013.01);
(Continued)

(58) Field of Classification Search
CPC ...... B60K 2370/141; B60K 2370/1438; B60K 2370/1464; B60K 2370/1523; B60K 2370/332; B60K 2370/48; B60K 2370/741; B60K 2370/782; B60K 35/00; G06F 2203/04108; G06F 3/017; G06F 3/0304; G06F 3/042; G06F 3/0421; G06F 3/04815; G06V 20/59; G06V 40/28
(Continued)

(56) References Cited

U.S. PATENT DOCUMENTS

| 10,198,080 | B1* | 2/2019 | Worley, III | G06F 3/017 |
| 2012/0038549 | A1* | 2/2012 | Mandella | G06F 3/011 345/156 |
| 2013/0265248 | A1 | 10/2013 | Nagahara et al. | |
| 2015/0320343 | A1* | 11/2015 | Utsunomiya | A61B 5/4824 600/595 |

(Continued)

FOREIGN PATENT DOCUMENTS

| DE | 10 2009 036 369 A1 | 2/2011 |
| JP | 2018-132986 A | 8/2018 |

(Continued)

OTHER PUBLICATIONS

European Search Report dated Nov. 18, 2021 in corresponding European Application No. 21157933.9, 11 pages.

*Primary Examiner* — Kwin Xie
(74) *Attorney, Agent, or Firm* — Crowell & Moring LLP

(57) ABSTRACT

When a gesture operation of a hand moving close to a display from left to right is performed, the return movement of the hand to the left side due to reflection by the wrist or the like may be detected. A detection control unit detects the approach of the hand to the display and notifies a data processing device of non-detection of hand approach when the amount of movement of the hand in the right direction starts to decrease after exceeding a threshold value. The data processing device accepts the right-moving gesture operation to perform a predetermined process when the amount of movement exceeds the threshold value.

9 Claims, 7 Drawing Sheets

(51) Int. Cl.
*G06V 40/20* (2022.01)
*G06F 3/042* (2006.01)
*B60K 35/00* (2006.01)
*G06F 3/03* (2006.01)
*G06K 9/00* (2022.01)

(52) U.S. Cl.
CPC .......... *G06F 3/04815* (2013.01); *G06V 40/28* (2022.01); *G06F 3/0304* (2013.01); *G06K 9/00496* (2013.01)

(58) Field of Classification Search
USPC .................................................. 345/156–169
See application file for complete search history.

(56) References Cited

U.S. PATENT DOCUMENTS

| | | | |
|---|---|---|---|
| 2016/0098095 A1* | 4/2016 | Gonzalez-Banos | A63F 13/92 345/156 |
| 2016/0187651 A1* | 6/2016 | Border | G06F 3/011 345/8 |
| 2016/0299635 A1 | 10/2016 | Glover et al. | |
| 2017/0083216 A1 | 3/2017 | Wild et al. | |
| 2017/0302914 A1* | 10/2017 | Tonar | B60K 35/00 |
| 2017/0308173 A1* | 10/2017 | Youn | G01V 8/20 |
| 2018/0005443 A1* | 1/2018 | Poulos | G06F 3/0346 |
| 2021/0255764 A1 | 8/2021 | Tanabe et al. | |

FOREIGN PATENT DOCUMENTS

| | | |
|---|---|---|
| JP | 2019-74465 | 5/2019 |
| WO | 2020/003914 A1 | 1/2020 |

\* cited by examiner

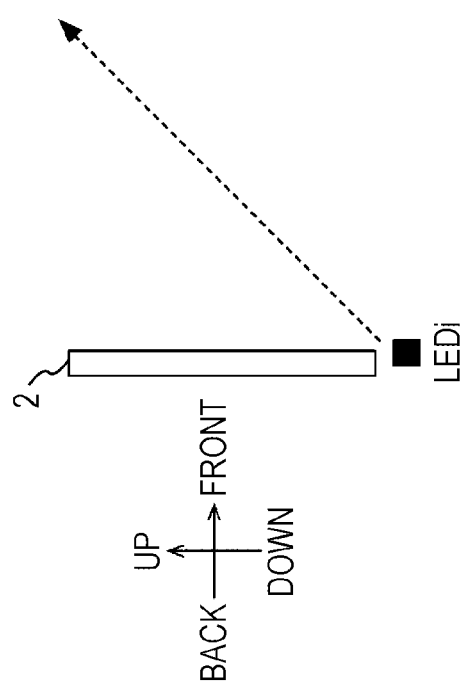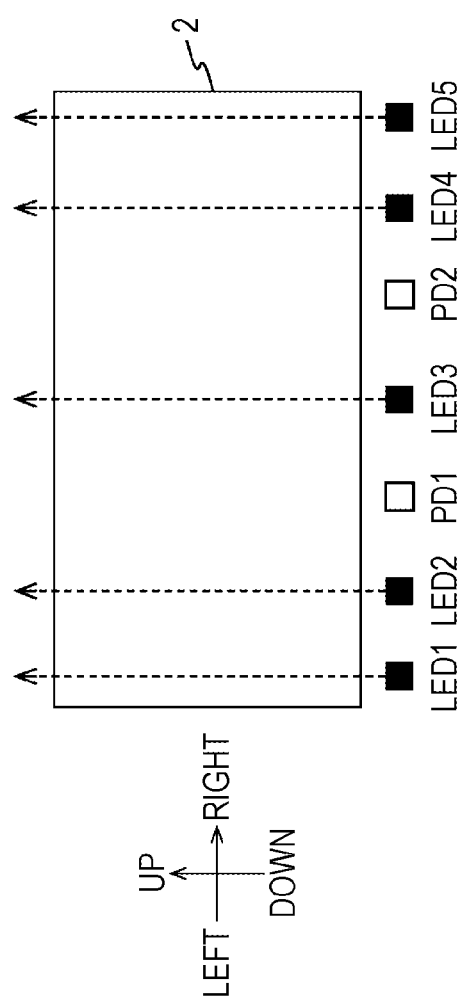

PROXIMITY DETECTION DEVICE AND INFORMATION PROCESSING SYSTEM

RELATED APPLICATION

The present application claims priority to Japanese Patent Application Number 2020-035466, filed Mar. 3, 2020, the entirety of which is hereby incorporated by reference.

BACKGROUND

1. Field of the Invention

The present invention relates to a technique configured to detect an approach of a user's hand to a display face of a display.

2. Description of the Related Art

As a technique configured to detect an approach of a user's hand to a display face of a display, there is known a detection system that emits infrared light to the front side of the display face of the display from a plurality of infrared LEDs disposed from left to right below a lower side of the display face of the display, detects reflected light of the infrared light reflected by the user's hand with a photodiode to detect the approach of the user's hand to the display face of the display, and accepts an operation on the display (for example, JP 2019-74465 A).

In this technology, the display is disposed at a position between the driver's seat and the passenger's seat on the dashboard of the automobile, and mainly accepts an operation on the display by a user who is a driver.

When using a display that is not placed in front of the user, such as the display disposed between the driver's seat and the passenger's seat described above, an operation on the display may not be accepted correctly due to infrared light reflection by the user's wrist and arm.

For example, in a case of accepting an operation of moving a hand approaching the display from left to right by a value larger than a predetermined threshold value as an operation on the display, when the operating user is a user seated to the left of the display, as the user moves his/her hand from left to right as shown in FIG. 7A, the inclination of the user's hand or arm increases as the user's hand moves to the right. Then, though the user's hand is moving to the right of the display, the position located left of the right edge of the display is erroneously detected as the position which the user's hand approaches due to the reflected light reflected by the user's wrist or arm.

In FIG. 7B, the right direction of the display is the positive x direction, the x coordinate of the left edge of the display is 0, and the x coordinate of the right edge is L, and the transition of the positions detected for the movement of the hand from left to right in FIG. 7A is shown. In this figure, for the movement in FIG. 7A, following the detection of the transition of the position moving from the position S at the left end of the display where the detection of the approach of the hand is started to the position P near the right end of the display, the transition of the position where the hand returns left to the position E where the detection of the hand is completed is erroneously detected.

Next, with respect to the transition of the position detected as shown in FIG. 7B, when the amount of movement from the position S where the detection of the approach of the hand is started to the position E where the detection of the hand is finished is calculated as the amount of movement of the hand, the amount of movement $\Delta x$ shown in FIG. 7C is calculated.

This amount of movement $\Delta x$ is compared with the predetermined amount Th, and when the amount of movement $\Delta x$ is larger than the threshold value, the movement of the hand performed by the user will be accepted as an operation on the display. The amount of movement $\Delta x$ shown in FIG. 7C is less than the amount of hand movement actually performed by the user due to an erroneous detection of the transition of the position returning left between P and E shown in FIG. 7B. Because of this decrease, the amount of movement $\Delta x$ does not exceed the threshold value, and the movement of the hand performed by the user is not accepted as an operation on the display.

SUMMARY

Therefore, an object of the present disclosure is to suppress omission of acceptance of an operation due to erroneous detection of a position due to reflection, by a user's wrist or arm, that occurs after a hand is moved outside a display when an operation of moving the hand approaching the display in one direction by a predetermined distance or more is accepted as an operation on the display.

To achieve the above object, according to the present disclosure, a proximity detection device configured to detect an approach of a user's hand to a display face of a display of a data processing device, where the display is used as an input device for the data processing device, includes an approach detection unit configured to detect whether the user's hand approaches the display face and a position, in a left-right direction, which a hand approaches using an infrared light source that is disposed outside the display face of the display and emits infrared light that passes in front of the display face and a photodetector that is disposed outside the display face and detects reflected light of the infrared light, and a notification unit configured to output non-detection to the data processing device when the approach detection unit does not detect an approach of the user's hand and output the position in the left-right direction detected by the approach detection unit to the data processing device when the approach detection unit detects an approach of the user's hand. Here, one of a left direction and a right direction is set as a first direction, and the notification unit outputs non-detection to the data processing device when an amount of movement of a position detected by the approach detection unit in the first direction decreases after exceeding a predetermined threshold value during a period of detecting that the approach detection unit is detecting an approach of the user's hand.

Here, in the proximity detection device, the approach detection unit may include a plurality of infrared light sources disposed in the left-right direction below the display face of the display and a plurality of the photodetectors disposed in the left-right direction below the display face of the display, and may turn on the plurality of infrared light sources in order to detect whether the user's hand approaches the display face and a position, in the left-right direction, which a hand approaches from the reflected light detected by each photodetector when each infrared light source is turned on.

According to such a proximity detection device, by outputting non-detection to the data processing device at the start of the decrease when the amount of movement of a hand in the first direction decreases after exceeding the threshold value, the position immediately before the amount of movement starts to decrease can be recognized by the data processing device as the movement end position.

Therefore, even when the hand position returns in the direction opposite to the first direction due to the erroneous detection of the position due to reflection by the user's wrist or arm that occurs after the hand moves by more than the threshold value in the first direction and moves outside the display, it is possible to cause the data processing device to accept a user operation corresponding to the movement by the threshold value or more in the first direction, so that it is possible to suppress omission of acceptance of the user operation.

In addition, the present disclosure provides an information processing system including the proximity detection device described above, and the data processing device. Here, a position in the left-right direction output from the proximity detection device when the proximity detection device starts to detect an approach of a user's hand is set as a start position and a position in the left-right direction output from the proximity detection device immediately before non-detection is output from the proximity detection device is set as an end position, and the data processing device includes a user operation acceptance unit configured to accept a predetermined user operation when an amount of movement in the first direction from the start position to the end position exceeds the threshold value.

Further, in order to achieve the above object, according to the present disclosure, a proximity detection device configured to detect an approach of a user's hand to a display face of a display of a data processing device, where the display is used as an input device for the data processing device, includes an approach detection unit configured to detect whether the user's hand approaches the display face and a position, in an up-down direction, which a hand approaches using an infrared light source that is disposed outside the display face of the display and emits infrared light that passes in front of the display face and a photodetector that is disposed outside the display face and detects reflected light of the infrared light, and a notification unit configured to output non-detection to the data processing device when the approach detection unit does not detect an approach of the user's hand and output the position in the up-down direction detected by the approach detection unit to the data processing device when the approach detection unit detects an approach of the user's hand. Here, an upward direction is set as a first direction, and the notification unit outputs non-detection to the data processing device when an amount of movement of a position detected by the approach detection unit in the first direction decreases after exceeding a predetermined threshold value during a period of detecting that the approach detection unit is detecting an approach of the user's hand.

According to such a proximity detection device, as in the above-mentioned proximity detection device in which the left direction or the right direction is the first direction, it is possible to suppress omission of acceptance of the user operation corresponding to a movement in the first direction, which is an upward direction, by a threshold value or more.

In addition, the present disclosure also provides an information processing system including such a proximity detection device and the data processing device. Here, a position in the up-down direction output from the proximity detection device when the proximity detection device starts to detect an approach of a user's hand is set as a start position and a position in the up-down direction output from the proximity detection device immediately before non-detection is output from the proximity detection device is set as an end position, and the data processing device includes a user operation acceptance unit configured to accept a predetermined user operation when an amount of movement in the first direction from the start position to the end position exceeds the threshold value.

The above information processing system may be installed in an automobile, and the display of the data processing device may be disposed between the driver's seat and the passenger's seat of the automobile.

As mentioned above, according to the present disclosure, it is possible to suppress omission of acceptance of an operation due to erroneous detection of a position due to reflection, by a user's wrist or arm, that occurs after a hand is moved outside a display when an operation of moving the hand approaching the display in one direction by a predetermined distance or more is accepted as an operation on the display.

BRIEF DESCRIPTION OF THE DRAWINGS

FIGS. 3A and 3B are diagrams illustrating an arrangement of a proximity detection sensor according to an embodiment of the present invention;

DETAILED DESCRIPTION OF THE PREFERRED EMBODIMENTS

Figure 1:
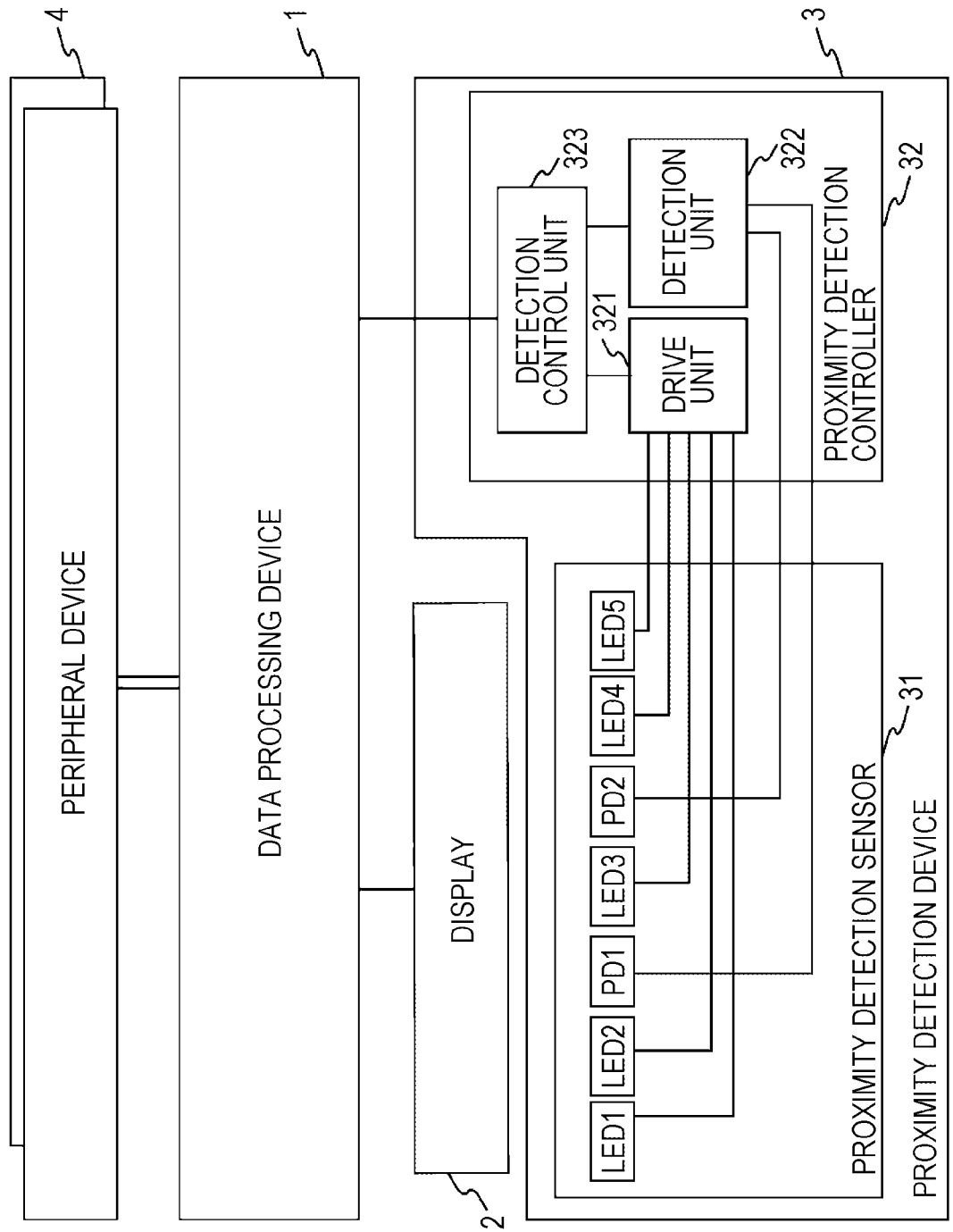
FIG. 1 is a block diagram illustrating a configuration of an information processing system according to an embodiment of the present invention.

In the following, an embodiment of the present invention will be described. FIG. 1 illustrates a configuration of an information processing system according to the present embodiment. The information processing system is a system installed in an automobile, and includes a data processing device 1 that executes various applications such as a car navigation application, a media player application, and the like, a display 2 that is used by the data processing device 1 for image display, a proximity detection device 3, and other peripheral devices 4 used by the data processing device 1.

Figure 2:
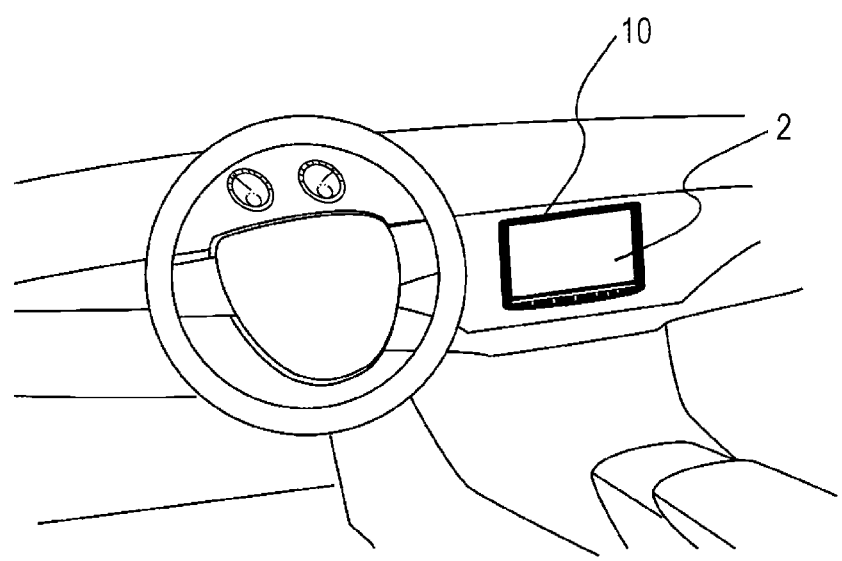
FIG. 2 is a diagram illustrating an arrangement of a display according to an embodiment of the present invention.

As shown in FIG. 2, the display 2 is disposed at a position, between the driver's seat and the passenger's seat, on the dashboard of an automobile with a display face facing rearward in the form of a display unit 10 in which the display 2 with a touch panel is integrated with the proximity detection device 3. Here, the display 2 may include on the display face a touch panel used by the data processing device 1 for coordinate input. In the illustrated example, the automobile is a left-handled automobile, and the driver, who is the main user of the information processing system, operates the display 2 from the left side of the display 2.

Returning to FIG. 1, the proximity detection device 3 includes a proximity detection sensor 31 and a proximity detection controller 32. The proximity detection sensor 31 includes five infrared LEDs of an LED 1, an LED 2, an LED 3, an LED 4, and an LED 5, and two photodiodes of a PD 1 and a PD 2 that detect infrared light.

In addition, the proximity detection controller 32 includes a drive unit 321 that drives and emits light from the LEDs, a detection unit 322 that converts current signals output by the PD 1 and the PD 2 into intensity signals that represent the intensity of infrared light incident on the PD 1 and the PD 2, and a detection control unit 323.

Next, assuming that a left-right direction, an up-down direction, and a front-back direction are determined with respect to the display 2 as illustrated in FIGS. 3A and 3B, the LED 1, the LED 2, the LED 3, the LED 4, and the LED 5 are disposed in order from left to right at a position slightly below a lower side of the display 2. A front direction is a display direction of the display 2.

In addition, the PD 1 is disposed at a position between the LED 2 and the LED 3 and converts reflected light of incident infrared light into a current signal, and the PD 2 is disposed at a position between the LED 3 and the LED 4 and converts reflected light of incident infrared light into a current signal, and they output the current signals.

Arrows in FIGS. 3A and 3B represent central axes of directional angles of the LED 1, the LED 2, the LED 3, the LED 4, and the LED 5, and the LED 1, the LED 2, the LED 3, the LED 4, and the LED 5 diagonally irradiate a front upper side of the display 2 with the infrared light.

Next, the detection control unit 323 of the proximity detection controller 32 controls the operations of the drive unit 321 and the detection unit 322, and repeats the detection process of detecting whether the user's hand approaches the display face of the display 2 and the approaching position based on the intensity of infrared light represented by the intensity signal output by the detection unit 322.

In this detection process, the detection control unit 323 lights the LED 1, the LED 2, the LED 3, the LED 4, and the LED 5 one by one, detects the intensity of the reflected light of the infrared light incident on the positions of the PD 1 and the PD 2 from the outputs of the PD 1 and the PD 2, detects whether the user's hand approaches the display face of the display 2 from the detected intensity of the reflected light at positions of the PD 1 and the PD 2, and calculates the position, in the left-right direction, of the user's hand approaching the display face of the display 2 from the relationship between the positions of the LED 1, the LED 2, the LED 3, the LED 4, and the LED 5, and the detected intensity of reflected light at the positions of the PD 1 and the PD 2.

Figure 4:
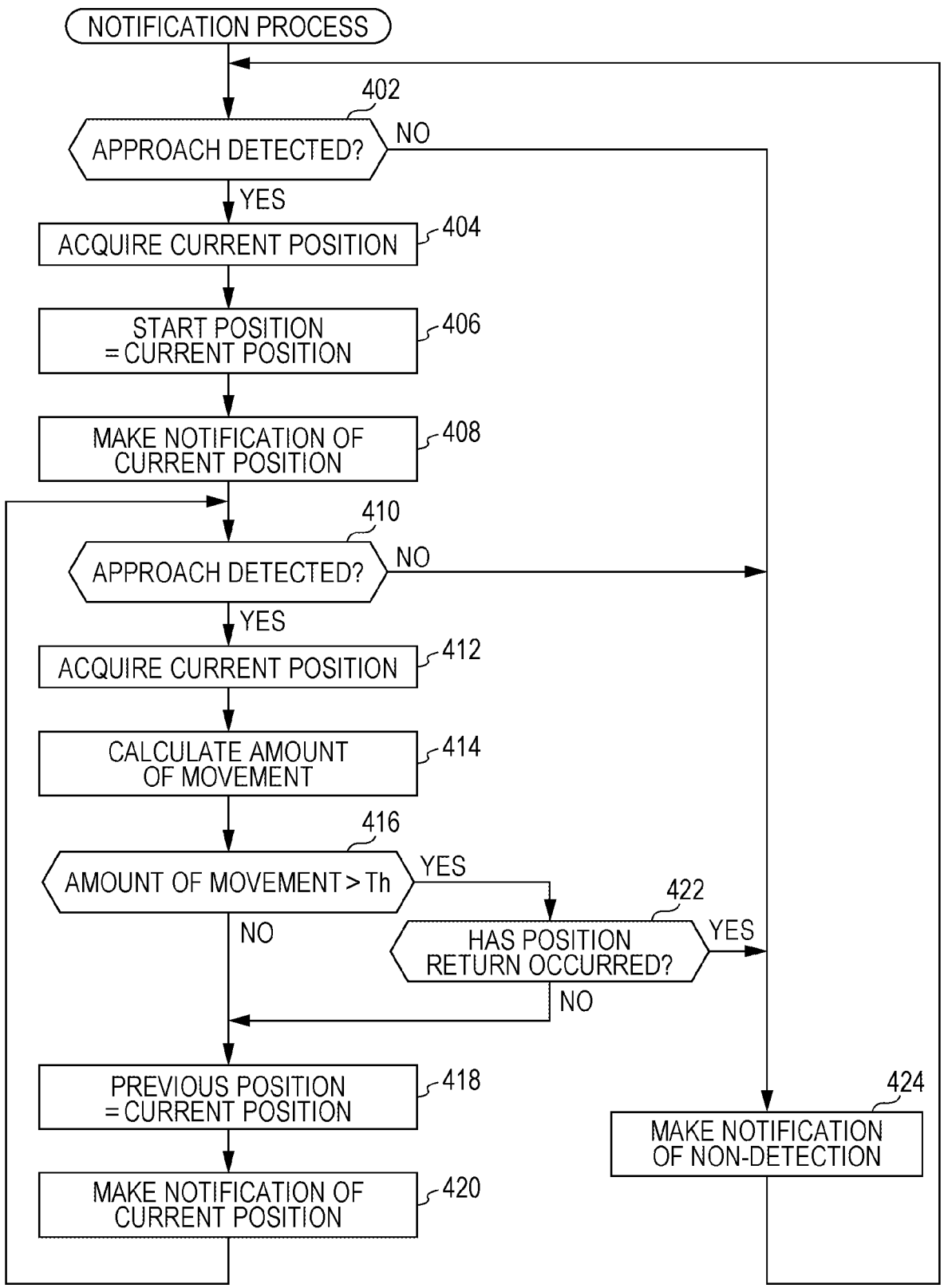
FIG. 4 is a flowchart illustrating notification processing according to an embodiment of the present invention.

Next, the notification process performed by the detection control unit 323 of the proximity detection controller 32 to notify the data processing device 1 of the content detected in the detection process will be described. FIG. 4 shows the procedure of this notification process. As shown, first, in the detection process, the detection control unit 323 checks whether an approach of the user's hand to the display face of display 2 is detected (step 402). When not detected, it notifies the data processing device 1 of non-detection (step 424) and the process returns to step 402.

On the other hand, when the approach is detected in the detection process (step 402), the position, in the left-right direction, of the user's hand approaching the display face of the display 2 calculated by the detection process is acquired as the current position (step 404), the acquired current position is stored as the start position (step 406), and then, the data processing device 1 is notified of the current position (step 408).

Next, in the detection process, the detection control unit 323 checks whether an approach of the user's hand to the display face of display 2 is detected (step 410). When not detected, it notifies the data processing device 1 of non-detection (step 424) and the process returns to step 402.

On the other hand, when the approach is detected in the detection process (step 410), the position, in the left-right direction, of the user's hand approaching the display face of the display 2 calculated by the detection process is acquired as the current position (step 412), and the distance from the stored start position to the acquired current position is calculated as the amount of movement (step 414).

Then, it is determined whether the amount of movement exceeds a predetermined threshold value Th (step 416). Here, the threshold value Th is, for example, 0.7 L, which is 70% of the width L of the display 2.

When the amount of movement does not exceed the threshold value Th (step 416), the current position acquired in step 412 is stored as the previous position (step 418), the detection control unit 323 notifies the data processing device 1 of the current position acquired in step 412 (step 420), and the process returns to step 410.

On the other hand, when it is determined in step 416 that the amount of movement exceeds the threshold value Th, it is examined whether the position return occurs (step 422). Here, in step 422, the previous position is stored, and it is determined that the position return has occurred when the current position acquired in step 412 is closer to the start position than the previous position, and it is determined that the position return has not occurred in other cases. When the previous position is not stored, it is determined that the position return has not occurred.

When the position return has not occurred (step 422), the current position acquired in step 412 is stored as the previous position (step 418), the data processing device 1 is notified of the current position acquired in step 412 (step 420), and the process returns to step 410.

On the other hand, when the position return has occurred, the data processing device 1 is notified of the non-detection (step 424), and the process returns to step 402. The notification process performed by the detection control unit 323 is described above. The data processing device 1 accepts the user's operation based on the notification from the detection control unit 323 through such a notification process. That is, when the amount of movement to the right direction from the current position when the detection of the approach of the hand is started to the current position notification which is provided immediately before notification of the non-detection of the approach of the hand is provided exceeds the above-mentioned threshold value Th, the data processing device 1 accepts the right-moving gesture operation by the user and performs a predetermined process associated with the right-moving gesture operation in advance.

Here, the current position when the detection of the approach of the hand is started is a current position notification which is first provided after notification of the non-detection of the approach from the detection control unit 323 is provided, or a current position when notification of the non-detection is not provided.

When the current position when the detection of the approach of the hand is started is set as a current position notification which is first provided after notification of the non-detection of the approach from the detection control unit 323 is provided, the current position notification which is first provided is set as a current position when the detection of hand approach is started. Further, the data processing device 1 performs, for example, switching of active applications and switching of screens to be displayed on the display 2 as a predetermined process associated with the right-moving gesture operation.

Figure 5A:
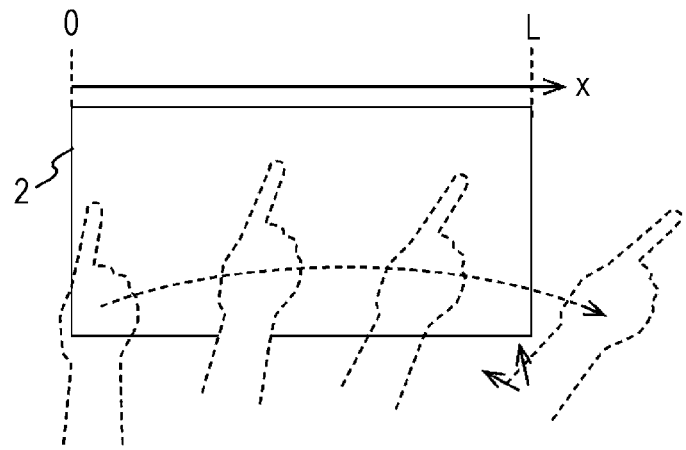
FIGS. 5A to 5D are diagrams illustrating a processing example of notification processing according to an embodiment of the present invention.
Figure 5B:
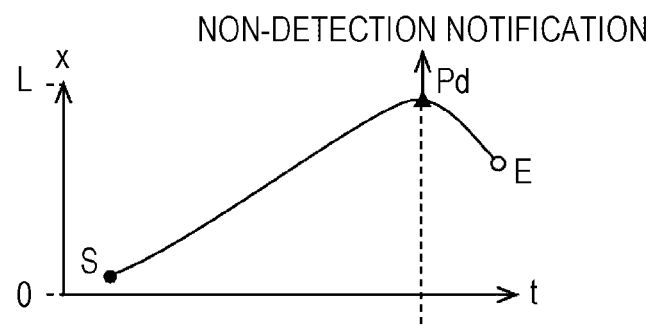
Figure 5C:
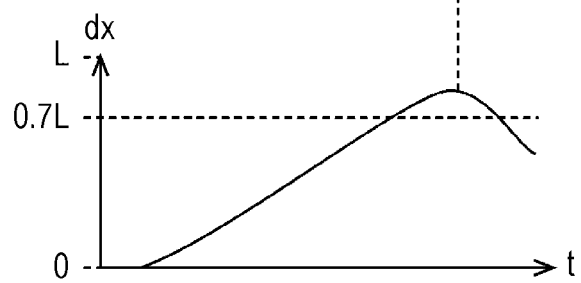

FIGS. 5A to 5C show a processing example of the notification process of the detection control unit 323 described above. Now, as shown in FIG. 5A, it is assumed that the user, who is the driver seated to the left of the display 2, has an intention to perform a right-moving gesture operation, and the hand brought close to the display 2 is moved in the right direction from the position at the left end of the display 2 to the position to the right of the display 2.

Then, after the user's hand moves to the right of the display 2, the position located left of the right end of the display 2 is erroneously detected as the position which the user's hand approaches due to the light reflected by the user's wrist or arm.

In this case, through the detection process of the detection control unit 323, the right direction of the display 2 is the positive x direction, the x coordinate of the left edge of the display 2 is 0, and the x coordinate of the right edge is L, and for the movement of the hand from left to right in FIG. 5A, the transition of the position where the hand moves from a position at the left edge of display 2 to a position near the right edge of display 2, and afterwards, returns to the left side is detected as shown in FIG. 5B.

Further, as shown in FIG. 5C, the amount of movement calculated in step 414 of the notification process of the detection control unit 323 with respect to the transition of the position shown in FIG. 5B decreases after the amount of movement dx to the right direction gradually increases.

Here, assuming that the threshold value Th used in step 416 of the notification process is 0.7 L, which is 70% of the width L of the display 2, since the user intends to perform a right-moving gesture operation, and moves the hand from left to right by 0.7 L as the threshold value Th or more as shown in FIG. 5A, the maximum value of the amount of movement dx to the right direction, that is, the amount of movement dx immediately before the start of decrease, exceeds the threshold value of 0.7 L as shown in FIG. 5C. Then, at the time Pd at which the amount of movement dx in FIG. 5B starts to decrease after exceeding the threshold value Th, 0.7 L, the occurrence of the position return is detected in step 422 of the notification process. In this case, the detection control unit 323 notifies the data processing device 1 of the current position, which is the position of the user's hand in the left-right direction, detected by the detection process from the time of the start point S of the detection of approach until the Pd where the occurrence of position return is detected, and the detection control unit 323 notifies the data processing device 1 of the non-detection at the time Pd at which the occurrence of position return is detected.

Figure 5D:
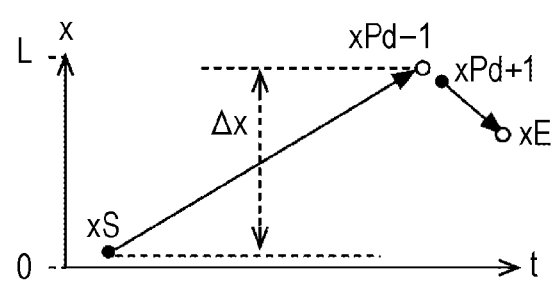

As a result, as shown in FIG. 5D, the data processing device 1 calculates, as the amount of movement Δx, the amount of movement to the right direction from the current position xS when the detection of hand approach is started until the current position xPd−1 notification of which is provided immediately before the time Pd when notification of the non-detection of hand approach is provided, and this amount of movement Δx is the amount of movement dx immediately before the amount of movement dx starts to decrease, so that it exceeds the threshold value Th, 0.7 L, and the right-moving gesture operation by the user is accepted in the data processing device 1.

Therefore, according to the present embodiment, when accepting the operation of moving the hand close to the display 2 to the right direction by the threshold value Th as the right-moving gesture operation by the user, it is possible to suppress omission of acceptance of the right-moving gesture operation by the user due to erroneous detection of the position due to reflection by the user's wrist or arm that occurs after the hand is moved outside the display 2.

In the notification process of the detection control unit 323, after notifying the data processing device 1 of non-detection at the time Pd when the occurrence of position return is detected, notification of the current position detected by the detection process to the data processing device 1 is resumed. The data processing device 1 accepts a user operation depending on the amount of movement from the current position xPd+1 notification of which is first provided until the current position xE immediately before the next non-detection notification after being notified of non-detection at the time Pd, as shown in FIG. 5D. Since the change in position that is erroneously detected by the light reflected by the user's wrist or arm after the user's hand moves right of display 2 is small, it is possible to suppress an acceptance of the user operation for the movement of the erroneously detected position.

The embodiment of the present invention is described as above. In the above embodiment, the case where the operation of moving the hand close to the display 2 to the right direction by more than the threshold value Th is accepted as the right-moving gesture operation by the user has been described, but the present embodiment can be applied in the same manner by replacing the right of the above description with the left in a case where, in the data processing device 1, the operation of moving the hand close to the display 2 to the left direction by more than the threshold value Th is accepted as the left-moving gesture operation by the user.

Figure 6A:
FIGS. 6A to 6C are diagrams illustrating another arrangement of a proximity detection sensor according to an embodiment of the present invention.
Figure 6B:
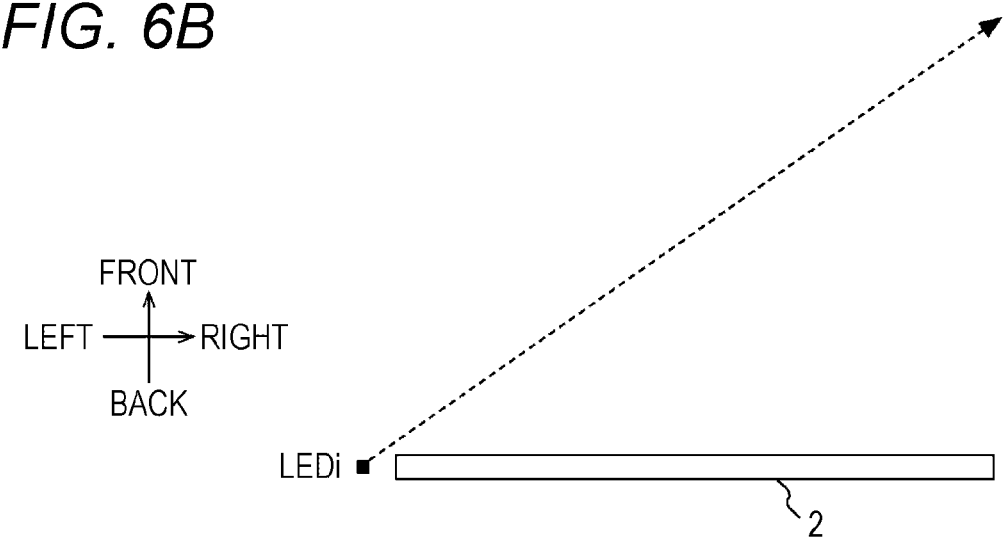

Further, the present embodiment may be applied by replacing the left side of the above description with the down side and the right side with the up side. That is, in this case, as shown in FIGS. 6A and 6B, infrared LEDs and photodiodes are disposed side by side in the up-down direction outside of the left side of display 2, the position of the approaching hand in the up-down direction is detected through the detection process of the detection control unit 323, and the data processing device 1 accepts the operation of moving the hand close to the display 2 upward by more than the threshold value Th as the upward moving gesture operation by the user to perform a predetermined process. However, the infrared LEDs and the photodiodes may be disposed side by side in the up-down direction outside of the right side of the display 2.

Figure 6C:
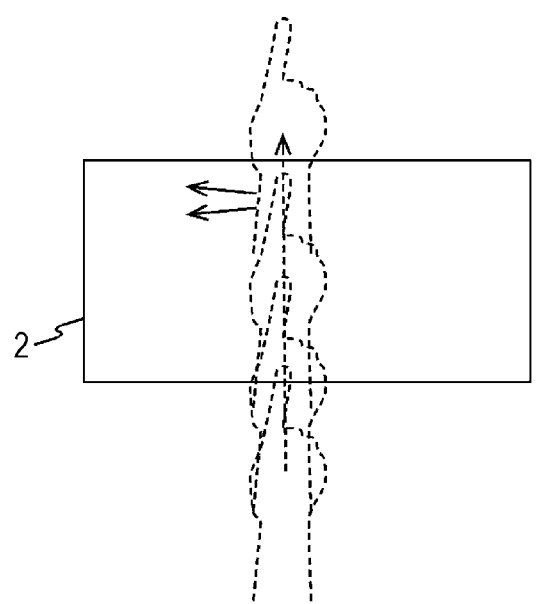
Figure 7A:
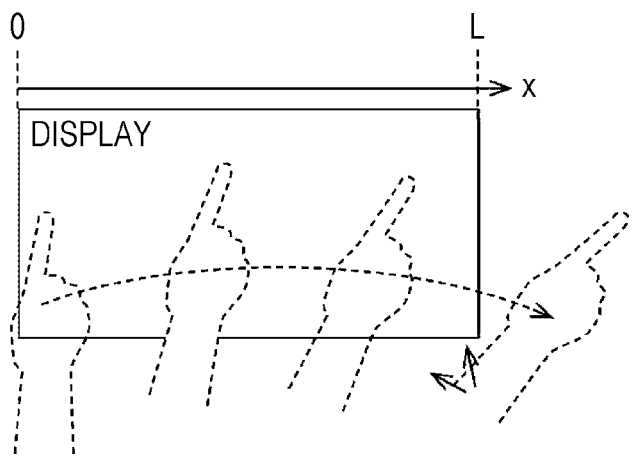
FIGS. 7A to 7C are diagrams illustrating a problem addressed by the present invention.
Figure 7B:
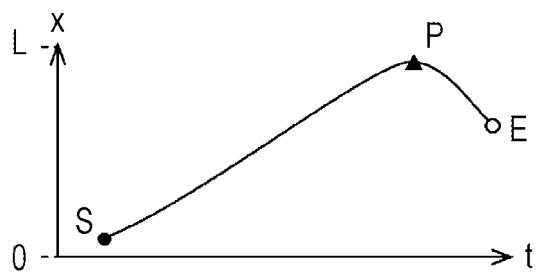
Figure 7C:
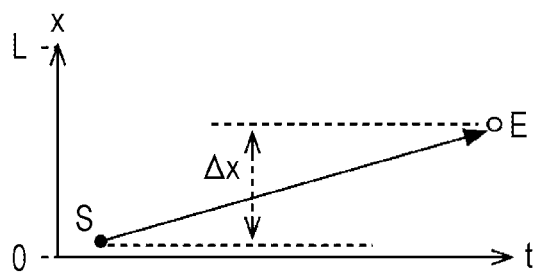

Here, when the user performs an upward moving gesture operation in which the hand brought close to the display 2 is moved upward, the position below the upper edge of the display 2 is erroneously detected as the position which the user's hand approaches due to the light reflected by the user's wrist or arm although the user's hand is moving above the display 2 as shown in FIG. 6C. As in the right-moving gesture operation described above, a position return may occur in which the detected hand position moves from the lower position of the display 2 to a position near the upper end of the display 2 and then returns to the lower side.

By applying the embodiment even when such a position return occurs, since non-detection is notified to the data processing device when the amount of upward movement of the detected hand position starts to decrease after exceeding the threshold value through the notification process, it is possible to suppress the omission of acceptance of the upward moving gesture operation.

Further, in the above description, the application to an information processing system in which the display 2 is provided at the position between the driver's seat and the passenger's seat on the dashboard of the automobile is described as an example, but the present embodiment can be applied to any information processing system.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A proximity detection device configured to detect an approach of a user's hand, the proximity detection device comprising:
    a data processing device having a display, the display having a display face viewable by the user and being used as an input device for the data processing device to detect a gesture operation by the user's hand;
    an approach detection unit configured to detect whether the user's hand approaches the display face of the display and a position, in a left-right direction, which a hand approaches using an infrared light source that is disposed outside the display face of the display and emits infrared light that passes in front of the display face viewable by the user and a photodetector that is disposed outside the display face and detects light of the infrared light that is reflected by the user's hand when the user's hand approaches the display face to perform the gesture operation; and
    a notification unit configured to output non-detection to the data processing device when the approach detection unit does not detect an approach of the user's hand to the display face, and to output the position in the left-right direction detected by the approach detection unit to the data processing device when the approach detection unit detects an approach of the user's hand to the display face, wherein
    one of a left direction and a right direction is set as a first direction, and the notification unit outputs non-detection to the data processing device when an amount of movement of a position of the user's hand detected by the approach detection unit in the first direction decreases after exceeding a predetermined threshold value during a period of detecting that the approach detection unit is detecting an approach of the user's hand to the display face during the gesture operation, and
    a position in the left-right direction output from the proximity detection device when the proximity detection device starts to detect an approach of a user's hand is set as a start position, and a position in the left-right direction output from the proximity detection device immediately before non-detection is output from the proximity detection device is set as an end position, and the data processing device includes a user operation acceptance unit configured to accept a predetermined user operation when an amount of movement in the first direction from the start position to the end position exceeds the threshold value.

2. The proximity detection device according to claim 1, wherein
    the approach detection unit includes a plurality of infrared light sources disposed side by side in the left-right direction below the display face of the display and a plurality of photodetectors disposed side by side in the left-right direction below the display face of the display, and turns on the plurality of infrared light sources in order to detect whether the user's hand approaches the display face and a position, in the left-right direction, which a hand approaches from the reflected light detected by each photodetector when each infrared light source is turned on.

3. A proximity detection device configured to detect an approach of a user's hand, the proximity detection device comprising:
    a data processing device having a display, the display having a display face viewable by the user and being used as an input device for the data processing device to detect a gesture operation by the user's hand;
    an approach detection unit configured to detect whether the user's hand approaches the display face of the display and a position, in an up-down direction, which a hand approaches using an infrared light source that is disposed outside the display face of the display and emits infrared light that passes in front of the display face viewable by the user and a photodetector that is disposed outside the display face and detects light of the infrared light that is reflected by the user's hand when the user's hand approaches the display face to perform the gesture operation; and
    a notification unit configured to output non-detection to the data processing device when the approach detection unit does not detect an approach of the user's hand to the display face, and to output the position in the up-down direction detected by the approach detection unit to the data processing device when the approach detection unit detects an approach of the user's hand to the display face, wherein
    an upward direction is set as a first direction, and the notification unit outputs non-detection to the data processing device when an amount of movement of a position of the user's hand detected by the approach detection unit in the first direction decreases after exceeding a predetermined threshold value during a period of detecting that the approach detection unit is detecting an approach of the user's hand to the display face during the gesture operation, and
    a position in the up-down direction output from the proximity detection device when the proximity detection device starts detecting an approach of a user's hand is set as a start position, and a position in the up-down direction output from the proximity detection device immediately before non-detection is output from the proximity detection device is set as an end position, and the data processing device includes a user operation acceptance unit configured to accept a predetermined user operation when an amount of movement in the first direction from the start position to the end position exceeds the threshold value.

4. The proximity detection device according to claim 1, wherein
    the proximity detection device is installed in an automobile, and wherein the display of the data processing device is disposed between a driver's seat and a passenger's seat of the automobile.

5. The proximity detection device according to claim 3, wherein
the proximity detection device is installed in an automobile, and wherein
the display of the data processing device is disposed between a driver's seat and a passenger's seat of the automobile.

6. A proximity detection device configured to detect an approach of a user's hand, the proximity detection device comprising:
a data processing device having a display, the display having a display face viewable by the user and being used as an input device for the data processing device to detect a gesture operation by the user's hand;
an approach detection unit configured to detect whether the user's hand approaches the display face of the display and a position on the display face which a hand approaches using a light source that is disposed outside the display face of the display and emits light that passes in front of the display face viewable by the user and a photodetector that is disposed outside the display face and detects light that is reflected by the user's hand when the user's hand approaches the display face to perform the gesture operation; and
a notification unit configured to output non-detection to the data processing device when the approach detection unit does not detect an approach of the user's hand to the display face, and to output the position detected by the approach detection unit to the data processing device when the approach detection unit detects an approach of the user's hand to the display face, wherein
the notification unit outputs non-detection to the data processing device when an amount of movement of a position of the user's hand detected by the approach detection unit in a first direction decreases after exceeding a predetermined threshold value during a period of detecting that the approach detection unit is detecting an approach of the user's hand to the display face during the gesture operation, and
a position output from the proximity detection device when the proximity detection device starts to detect an approach of a user's hand is set as a start position, and a position in the first direction output from the proximity detection device immediately before non-detection is output from the proximity detection device is set as an end position, and the data processing device includes a user operation acceptance unit configured to accept a predetermined user operation when an amount of movement in the first direction from the start position to the end position exceeds the threshold value.

7. The proximity detection device according to claim 6, wherein
the approach detection unit includes a plurality of light sources disposed below and along a side of the display face of the display and a plurality of photodetectors disposed below and along a side of the display face of the display, and turns on the plurality of light sources in order to detect whether the user's hand approaches the display face and a position which a hand approaches from the reflected light detected by each photodetector when each light source is turned on.

8. The proximity detection device according to claim 6, wherein the plurality of light sources and the plurality of photodetectors are disposed along the same side of the display face of the display, and at least one light source is disposed between adjacent photodetectors.

9. The proximity detection device according to claim 6, wherein the proximity detection device is installed in an automobile, and the display of the data processing device is disposed between a driver's seat and a passenger's seat of the automobile.

* * * * *